United States Patent
O'Neill et al.

(10) Patent No.: US 10,863,270 B1
(45) Date of Patent: Dec. 8, 2020

(54) BEAMFORMING FOR A WEARABLE COMPUTER

(71) Applicant: Amazon Technologies, Inc., Seattle, WA (US)

(72) Inventors: Jeffrey Cornelius O'Neill, Somerville, MA (US); Amit Singh Chhetri, Santa Clara, CA (US); Philip Ryan Hilmes, San Jose, CA (US); Ramya Gopalan, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/361,808

(22) Filed: Mar. 22, 2019

Related U.S. Application Data (63) Continuation of application No. 15/247,670, filed on Aug. 25, 2016, now Pat. No. 10,244,313, which is a
(Continued)

(51) Int. Cl.
*H04R 3/00* (2006.01)
*G10L 25/84* (2013.01)
(Continued)

(52) U.S. Cl.
CPC .............. *H04R 3/005* (2013.01); *G10L 15/22* (2013.01); *G10L 25/84* (2013.01); *H04R 1/406* (2013.01);
(Continued)

(58) Field of Classification Search
CPC ...... H04R 3/005; H04R 2499/11; H04R 1/32; H04R 1/326; H04R 1/406; H04R 2430/20; H04R 29/004; H04R 29/005; H04R 2201/401; H04R 2201/023; H04R 2201/40; G10L 2021/02166; G10L 15/22; G10L 25/84; G10L 2015/223; H04M 1/6041; H04M 2250/12; H04S 7/303;
(Continued)

(56) References Cited

U.S. PATENT DOCUMENTS 8,970,487 B2 3/2015 Leyvand et al.
8,981,994 B2 3/2015 Sorenson
(Continued)

OTHER PUBLICATIONS

Office Action for U.S. Appl. No. 15/247,670, dated Jan. 17, 2018, O'Neill et al., "Beamforming for Wearable Computer," 18 pages.
(Continued)

*Primary Examiner* — Jason R Kurr
(74) *Attorney, Agent, or Firm* — Lee & Hayes, P.C.

(57) ABSTRACT

A wearable computer is configured to use beamforming techniques to isolate a user's speech from extraneous audio signals occurring within a physical environment. A microphone array of the wearable computer may generate audio signal data from an utterance from a user's mouth. A motion sensor(s) of the wearable computer may generate motion data from movement of the wearable computer. This motion data may be used to determine a direction vector pointing from the wearable computer to the user's mouth, and a beampattern may be defined that has a beampattern direction in substantial alignment with the determined direction vector to focus the microphone array on the user's mouth for speech isolation.

20 Claims, 7 Drawing Sheets

Related U.S. Application Data continuation of application No. 14/229,406, filed on Mar. 28, 2014, now Pat. No. 9,432,768.

(51) Int. Cl.
 *G10L 15/22* (2006.01)
 *H04R 1/40* (2006.01)

(52) U.S. Cl.
 CPC .. *G10L 2015/223* (2013.01); *H04R 2201/023* (2013.01); *H04R 2201/401* (2013.01); *H04R 2499/11* (2013.01)

(58) Field of Classification Search
 CPC ........... G06K 9/00335; G06K 9/00342; G06K 9/00348; G06K 9/00355; G06K 2009/00395
 USPC ........................................................ 381/92
 See application file for complete search history.

(56) References Cited

U.S. PATENT DOCUMENTS

| | | | |
|---|---|---|---|
| 2005/0060142 A1* | 3/2005 | Visser | G10L 21/0208 704/201 |
| 2011/0158425 A1 | 6/2011 | Hayakawa | |
| 2012/0120218 A1 | 5/2012 | Flaks et al. | |
| 2012/0163625 A1 | 6/2012 | Siotis et al. | |
| 2012/0182429 A1 | 7/2012 | Forutanpour et al. | |
| 2013/0177168 A1 | 7/2013 | Inha et al. | |
| 2013/0332156 A1* | 12/2013 | Tackin | H04M 1/6041 704/226 |
| 2014/0270248 A1 | 9/2014 | Ivanov et al. | |
| 2014/0278394 A1 | 9/2014 | Bastyr et al. | |
| 2015/0358579 A1 | 12/2015 | Shin | |
| 2016/0140949 A1* | 5/2016 | Fan | G10K 11/178 381/71.11 |
| 2017/0150255 A1* | 5/2017 | Wang | G04G 21/06 |
| 2017/0230754 A1* | 8/2017 | Dusan | H04R 5/04 |

OTHER PUBLICATIONS

Office action for U.S. Appl. No. 14/229,406, dated Nov. 25, 2015, O'Neill et al., "Beamforming for a Wearable Computer," 16 pages.
Office Action for U.S. Appl. No 15/247,670, dated Jun. 15, 2018, O'Neill, "Beamforming for a Wearable Computer," 16 pages.

Office action for U.S. Appl. No. 15/247,670, dated Jul. 24, 2017, O'Neill et al., "Beamforming for a Wearable Computer," 18 pages.

\* cited by examiner

DATA STORE
120

| TIME 302 | MOTION DATA 304 | ACTIVITY 306 | AZIMUTH DIRECTION (DEGREES) 308 | ELEVATION DIRECTION (DEGREES) 310 | DISTANCE (INCHES) 312 | CONFIDENCE LEVEL 314 |
|---|---|---|---|---|---|---|
| $t_{-2}$ | $d_{xyz}, v_{xyz}, a_{xyz}, \theta_{xyz}, \omega_{xyz}, \alpha_{xyz}$ | Walking | 5 | 85 | 28 | 80% |
| $t_{-1}$ | $d_{xyz}, v_{xyz}, a_{xyz}, \theta_{xyz}, \omega_{xyz}, \alpha_{xyz}$ | Walking | 3 | 15 | 27 | 70% |
| $t_0$ | $d_{xyz}, v_{xyz}, a_{xyz}, \theta_{xyz}, \omega_{xyz}, \alpha_{xyz}$ | Walking | 8 | 85 | 28 | 80% |
| $t_{+1}$ | $d_{xyz}, v_{xyz}, a_{xyz}, \theta_{xyz}, \omega_{xyz}, \alpha_{xyz}$ | Running | 12 | 10 | 13 | 95% |
| $t_{+2}$ | $d_{xyz}, v_{xyz}, a_{xyz}, \theta_{xyz}, \omega_{xyz}, \alpha_{xyz}$ | Running | 25 | 45 | 16 | 60% |
| $t_{+3}$ | $d_{xyz}, v_{xyz}, a_{xyz}, \theta_{xyz}, \omega_{xyz}, \alpha_{xyz}$ | Running | 14 | 20 | 12 | 90% |

BEAMFORMING FOR A WEARABLE COMPUTER

CROSS REFERENCE TO RELATED APPLICATION

This application is a continuation of U.S. patent application Ser. No. 15/247,670, filed Aug. 25, 2016, which is a continuation of U.S. patent application Ser. No. 14/229,406, filed Mar. 28, 2014, and entitled "BEAMFORMING FOR A WEARABLE COMPUTER," the entirety of which is herein incorporated by reference.

BACKGROUND

Wearable computers are gaining popularity among consumers. Wearable computers such as smart watches, fitness wrist bands, and the like, provide a variety of utilities to a user. For example, wearable computers may facilitate tracking or recording personal information (e.g., health and fitness data, image data, location data, voice memos, etc.), engaging in social networking, or navigating, among other useful benefits provided by the convenience of wearable computers.

Although many wearable computers provide at least some sort of touch-based user input (e.g., push buttons, touch screens, etc.), some wearable computers are further configured to receive and process voice-based input, which is a convenient and popular user input mechanism. Accordingly, wearable computers are often equipped with a microphone(s) to capture audio signals in the form of sound waves, as well as speech recognition software to enable voice input through recognition of speech commands or audible gestures such as claps, fingersnaps, and the like that may be interpreted as a gesture by the computer. In these scenarios, a user typically brings the wearable computer in close proximity to his/her mouth in order for the wearable computer to recognize such speech commands. This action is taken most often in noisy environments where a user's voice may be impaired by noise present in the physical environment.

However, the act of bringing a wearable computer close to one's mouth every time that voice input is to be provided may be undesirable and is often inconvenient. In some scenarios it is inconvenient, and sometimes dangerous, to interrupt certain activities (e.g., driving and running) by performing such an action before voice input is provided.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Disclosed herein are techniques and systems for isolating a user's speech. Particularly, beamforming techniques may be used with a microphone array of a wearable computer to isolate a user's speech from extraneous audio signals occurring within a physical environment. In some embodiments, the beamforming techniques disclosed herein are based on a beamforming technique known as delay-and-sum beamforming. Delay-and-sum beamforming, in perhaps its simplest form, involves a process of taking a set of signals received at a microphone array, and delaying (i.e., time delaying) the signals by varying amounts, and then adding the delayed signals together to obtain a single signal. The amount, or size, of the delays applied to the raw signals may be determined by the direction or location at which the microphone array is aimed.

The beamforming techniques disclosed herein take advantage of motion sensors on or within the wearable computer that are configured to collect motion data when the wearable computer is moved within a three-dimensional (3D) space. This collected motion data may be used to determine a direction vector pointing from the wearable computer in a direction of the user's mouth (i.e., the audio source of interest). With this direction vector, the wearable computer may use beamforming to determine parameters corresponding to a beampattern having a beampattern direction in substantial alignment with the direction vector such that the microphone array is focused in the direction of the user's mouth to isolate the user's speech from any extraneous noise in the environment.

Accordingly, a wearable computer may comprise one or more processors, one or more memories storing instructions executable by the one or more processors, a microphone array comprising a plurality of microphones, and one or more motion sensors. The microphone array may be configured to generate an audio signal from sound within a physical environment, including an utterance detected by the microphone array, the utterance being from a user associated with the wearable computer. The one or more motion sensors may be configured to generate motion data in response to movement of the wearable computer (e.g., an arm swing of the user). A localization module stored in the one or more memories may use the motion data from the motion sensor(s) to determine a direction vector pointing from the wearable computer in a direction of the user's mouth. Using this direction vector, a beamforming module stored in the one or more memories may determine parameters corresponding to a beampattern in the direction of the user's mouth. In this manner, the microphone array may be focused on the user's mouth to isolate the user's speech. That is, the beampattern defined by the beamformer may be used to selectively gather audio, using the microphone array, from a particular spatial location where the user's mouth is located.

In some embodiments, the aforementioned localization module may be configured to utilize a user-specific localization model to determine the direction vector pointing from the wearable computer to the user's mouth. In some embodiments, the localization model may utilize a multi-body skeletal model that models the dynamic behavior of at least a portion of a human body. The multibody skeletal model and the motion data may be used together to determine the direction vector from the wearable computer to the user's mouth.

The beamforming techniques disclosed herein enable a user associated with the wearable computer to provide voice input to the wearable computer without having to move the wearable computer close to his/her mouth. This provides more convenience to the user when they desire to continue an activity (e.g., driving, running, etc.) without interruption. The audio that is isolated by the techniques and systems disclosed herein may be used to generate audio signals that are used (stored and/or processed) by other modules of the wearable computer and/or other computing devices. In one example, audible commands issued from the user's mouth may be processed in order to execute applications (e.g., speech recognition) on the wearable computer.

Figure 1:
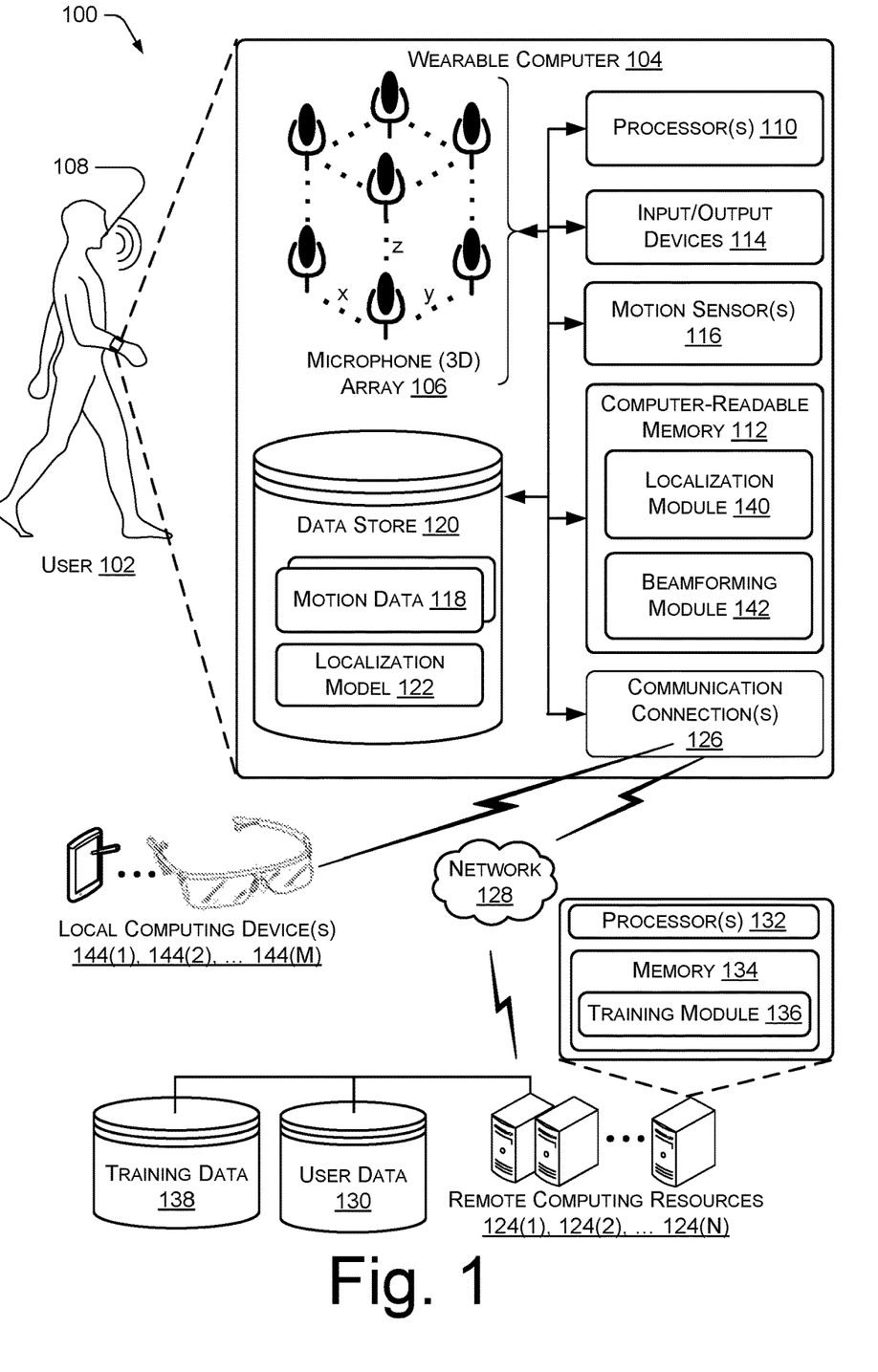
FIG. 1 shows an illustrative environment for implementing beamforming techniques and systems to isolate a user's speech.

FIG. 1 shows an illustrative environment 100 for implementing beamforming techniques and systems as disclosed herein. A user 102 (sometimes referred to herein as a "consumer" or an "individual") may be associated with a wearable computer 104 (sometimes referred to herein as a "wearable computing device"). The user 102 and the wearable computer 104 may be positioned within the environment 100, which may be an outdoor setting (e.g., an urban environment), an indoor setting (e.g., inside a room, a vehicle, etc.), or any other physical environment depending on where the user 102 is currently located.

The wearable computer 104 may be any suitable mobile computing device that is wearable on an appendage of the user 102, such as the user's wrist, arm, hand, finger, leg, ankle, and the like. Accordingly, a wearable computer 104 may include any suitable wearable computing device, including, without limitation, a smart watch, a smart wrist band (e.g., fitness trackers like the Nike® FuelBand, Fitbit® wristband, an audio-recording wristband, etc.), a smart anklet, a smart shoe, a smart glove, or any other suitable accessory that can be configured as a wearable computer 104 to be worn on an appendage of the user 102. FIG. 1 shows the wearable computer 104 in the form of a smart watch worn on the wrist of the user 102, but it is to be appreciated that the wearable computer 104 may comprise any suitable wearable computing device, as discussed above.

In some embodiments, the wearable computer 104 may include a microphone array 106 comprising a plurality of microphones distributed in a three-dimensional (3D) arrangement. By arranging the microphone array 106 in a 3D configuration, the wearable computer 104 is thereby configured to define and steer beams about a 3D space during beamforming. In other words, a beampattern may be directed to a particular azimuth and elevation direction relative to the microphone array 106 when the microphones of the microphone array 106 are arranged three-dimensionally.

The 3D arrangement, in terms of a distance or spacing between individual microphones of the microphone array 106, may be regular or irregular, and may have a symmetrical or asymmetrical distribution. Accordingly, the number and placement of the microphones within the microphone array 106 may vary. In some embodiments, the plurality of microphones may be arranged in stacked planes of any suitable pattern within each plane. For example, the microphone array 106 may comprise as few as three microphones that make up a first plane, and another three or more microphones of a second plane positioned orthogonally (i.e., above or below) with respect to the first plane. The arrangement of the microphones of the microphone array 106 within individual planes may be in any shape or form, including circular, rectangular, square, triangular, or any suitable geometric shape or regular or irregular pattern.

The microphone array 106 may be mounted within, or on a surface of, the wearable computer 104 (e.g., within a strap or band portion of a smart watch). Furthermore, gain may be applied differently or uniformly across the microphones of the microphone array 106. For example, the microphones that are generally closer to an audio source of interest when the wearable computer 104 is worn by the user 102 as instructed may have increased gain relative to other microphones in the microphone array 106 to provide greater signal amplitude at the microphones closer to the audio source.

The microphone array 106 may be configured to detect audio or sound, such as an utterance, in the form of sound waves and to generate audio signals in response to the detected audio. As used herein, audio includes speech, audible gestures (e.g., clap, fingersnaps, tapping, etc.), street noise, footsteps, or any sound, whether vocally produced or otherwise, that is emitted from a sound or audio source, including a human mouth, audio signaling devices, or any other noise source such as mechanical systems, and so forth. Moreover, the audio may include frequencies generally audible to the human ear. As such, the audio may originate from many different audio sources. In FIG. 1, the user's mouth 108 is considered to be an audio source. Other audio sources (e.g., other user's mouths) may also generate audio, sound, or utterances that are detectable by the microphone array 106. Regardless of the source, the audio signals generated by the microphone array 106 may be processed in real-time by other components of the wearable computer 104 and/or stored for later processing by such components.

In at least one configuration, the wearable computer 104 comprises one or more processors 110 and one or more forms of computer-readable memory 112. The wearable computer 104 may also include additional data storage devices. Such additional storage may include removable storage (e.g., universal serial bus (USB) drives) and/or non-removable storage.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, compact disc read-only memories (CD-ROMs), digital video discs (DVDs), read-only memories (ROMs), random access memories (RAMs), erasable programmable read-only memories (EPROMs), electrically erasable programmable read-only memories (EEPROMs), flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

The wearable computer 104 may further include one or more input and/or output devices 114 ("I/O devices" 114). Examples of I/O devices 114 capable of providing input functionality include, without limitation, a touch screen display, physical buttons (e.g., keyboard or keypad) on the wearable computer 104, a camera(s), additional microphones or microphone arrays, pointing devices (e.g., pen, stylus, etc.), remote controls, or any other suitable input device for interfacing with the wearable computer 104. Examples of I/O devices 114 capable of providing output functionality include, without limitation, a display, a projector, speakers, or any other suitable output device coupled communicatively to the processor(s) 110 and the computer-readable memory 112 that are configured to provide output to the user 102. The wearable computer 104 may be configured to provide any suitable content or data via the I/O devices 114 to the user 102, such as streamed video content, image or text content, audio content, etc.

In some embodiments, the wearable computer 104 further comprises one or more motion sensors 116 that are configured to generate motion data 118 based on sensed movement of the wearable computer 104 about a 3D space. For example, the user 102, while wearing the wearable computer 104 on his/her wrist, may swing his/her arm in a back and forth motion while walking. Other movements associated with other activities are also contemplated, and walking is introduced merely as an illustrative activity that may involve one possible type of movement of the wearable computer 104. In any case, as the wearable computer 104 is moved about a 3D space within the environment 100, the one or more motion sensors 116 may continually collect the motion data 118, which is shown to be storable by the wearable computer 104 within a data store 120. For instance, the wearable computer may store the motion data 118 in the data store 120 permanently, or for a limited period of time or until a threshold amount of motion data 118 is stored, such as in a buffer or similar storage component.

The one or more motion sensors 116 may include gyroscopes, accelerometers, or any other suitable sensor, or combination of sensors, configured to provide six-component motion sensing. That is, the one or more motion sensors 116 may be configured to sense and generate the motion data 118 in the form of translational and/or rotational movement about a 3D space. In other words, the motion sensor(s) 116 may be configured to measure and generate data relating to the extent, rate, and/or acceleration of translational movement in 3D space (X, Y, and Z movement), as well as the extent, rate, and/or acceleration of rotation in 3D space (roll, pitch, and yaw). As such, the motion sensor(s) 116 may be capable of detecting movement so that information such as orientation and/or relative location of the wearable computer 104 can be determined based on detected movement. For example, orientation relative to a ground plane ("ground"), such as the plane that is coplanar with, or parallel to, the surface of the earth, may be determined in order to detect how the wearable computer 104 (i.e., how a reference plane local to the wearable computer 104) is oriented relative to ground.

In order to make sense of the motion data 118 collected by the wearable computer 104 so that it may be used for the beamforming techniques disclosed herein, one or more components of the wearable computer 104 may be configured to determine the dynamic behavior of a user's body, and how the motion data 118 may be interpreted or otherwise utilized to predict a location or direction of the user's mouth 108 relative to the wearable computer 104. In some embodiments, this may be accomplished by training a localization model 122 to interpret the motion data 118 collected by the wearable computer 104 for localization purposes (i.e., map the motion data 118 to directionality of the user's mouth 108 based on established correlations between inputs (e.g., motion data) and outputs (e.g., directionality). Since training such a localization model 122 may be a computationally intensive task, such training may be performed by remote computing resources 124(1), 124(2), ..., 124(N), such as one or more servers of a cloud computing environment.

Accordingly, the wearable computer 104 may include communications connection(s) 126 that allow the wearable computer 104 to communicate with the remote computing resources 124(1)-(N) via a network 128. For example, the wearable computer 104 may transmit or upload (periodically or by user command) the motion data 118, and/or other suitable data including, but not limited to, raw audio data (i.e., audio data without beamforming) obtained by the microphone array 106, via the communications connection(s) 126 to the remote computing resources 124(1)-(N) where the data may be used for various purposes including training (or re-training) the localization model 122 and/or validating localization determinations using the remote computing resources 124(1)-(N). The wearable computer 104 may also access the remote computing resources 124(1)-(N) via the network 128 to download or upload various types of data, and may be configured to use the network 128 to receive messages such as electronic mail (e-mail), short message service (SMS) text messages, messages via an application associated with the wearable computer 104, and the like, as well as place and receive phone calls via the network 128. The network 128 is representative of many different types of networks, such as cable networks, the Internet, local area networks, mobile telephone networks, wide area networks and wireless networks, or a combination of such networks.

The remote computing resources 124(1)-(N) may comprise one or more servers arranged as a server farm or server cluster, and they may be maintained and operated by an entity such as a service provider associated with the wearable computer 104. For example, a service that facilitates cloud-based storage and management of user data 130 for users, such as the user 102, may maintain the remote computing resources 124(1)-(N) to provide various services to users. For example, the remote computing resources 124(1)-(N) may handle requests, such as in the form of a uniform resource locator (URL), from the wearable computer 104, and serve, in response, various information and data, such as in the form of a web page, to the wearable computer 104, allowing the user 102 to interact with the data provided by the remote computing resources 124(1)-(N).

In this manner, the remote computing resources 124(1)-(N) may be equipped with one or more processors 132 and memory 134 to store applications and data. According to some embodiments, a training module 136 is stored in the memory 134 and executes on the processor(s) 132 to train the localization model 122 based on training data 138.

In order to develop a trained localization model, such as the localization model 122, that may be utilized by the wearable computer 104 for localization of the user's mouth 108, a training process may occur in some instances, such as an offline training process managed by the training module 136 on the remote computing resources 124(1)-(N). This training process may involve collecting and recording data, including motion data, raw audio data, and the like, from a number of human subjects (e.g., hired individuals or volunteers). Motion data may be collected from these subjects using one or more motion sensors. For example, each subject involved in the training process may wear a device similar to the wearable computer 104 (e.g., a prototype device), or simply one or more motion sensors similar to the motion sensor(s) 116, on at least one of his/her appendages, such as his/her wrist. Raw audio data may be collected by the microphone array 106 of the wearable computer 104 and used for training purposes. As a subjects moves while performing various predesigned activities (e.g., running, walking, driving, etc.), motion data may be collected by the motion sensor(s) 116 and raw audio data may be collected using the microphone array 106, and this collected data may be recorded in association with other data, such as a time (e.g., time of day) that the data was collected and other "truth" data regarding the type of activity associated with the collected data. The truth data may serve as training labels of the training data 138. The subjects may be of different shapes and sizes (height, weight, proportions, etc.) so that a wide variety of training data 138 is collected. Information such as a range of motion for parts of the body may be inferred directly from the motion data collected about the subjects, and correlations between the raw audio data and the relative location of the subjects' mouths with respect to the wearable computer 104 may be established. In this manner, the dynamic behavior of the subjects' bodies may be modeled from the collected data itself.

In some embodiments, additional data may be collected from the subjects during training, such as information regarding at least a portion of the subjects' bodies. For example, dimensions of at least a portion of a skeletal structure may be collected from the subjects during training, such as the length of one or more bones (e.g., lower and upper arm bones). Additionally, the dynamic behavior of the subjects' bodies may be collected through visual tracking or any other suitable methodology of determining a multibody skeletal model of the subjects. The multibody model may be described or defined in terms of rigid, or semi-rigid, bodies (e.g., bones), links (e.g., joints), constraint conditions, and degrees of freedom, and parameters of this information may be obtained from the subjects' bodies during the training process. The multibody skeletal models that are developed may describe a range of motion, via equations of motion, for different parts of the body (e.g., a range of motion of the arms) relative to the multibody system as a whole. Such a multibody skeletal model may act as a 3D map of the human body, and may contain information on the dynamic behavior of the body. Simulation of a constrained multibody skeletal system may be performed from the multibody skeletal model to determine how the different parts of a user's body will move relative to the multibody system as a whole.

After sufficient training data 138 is collected from the subjects, a localization model 122 that is user-specific may be learned or trained from the collected training data 138. In some embodiments, the training module 136 may train the localization model 122 as an artificial neural network. The neural network may learn to output a direction vector from a wearable computer, such as the wearable computer 104, which points in a direction of an audio source, such as the user's mouth 108. Other types of models other than neural networks may be used by the training module 136 to develop a trained localization model 122, including, without limitation, a hidden Markov model (HMM), a Kalman filter (or enhanced Kalman filter), a Bayesian network (or Bayesian belief network), a support vector machine (SVM), a decision tree, or any suitable machine learning model that uses algorithms to effectively map input (e.g., motion data) to output (direction vectors). It is to be appreciated that the machine learning used to develop the localization model 122 may use supervised or unsupervised machine learning techniques.

The trained localization model 122 resulting from the aforementioned training process may determine correlations between motion data and the structure and dynamic behavior of a user's body so that localization of the user's mouth 108 may be performed. In some embodiments, the trained localization model 122 may be configured to predict future movement, or relative location, of the wearable computer 104 based on a history of the motion data 118 collected by the motion sensor(s) 116, and to use the predicted future movement or relative location for localization purposes. In such a scenario, it should be noted that the trained localization model 122, in principle, may not constrain movement of the wearable computer 104 to adhere to a connectedness of contiguous point locations in a 3D space. For instance, the trained localization model 122 could conceivably predict that the wearable computer 104 will jump over a substantial distance in 3D space without traversing any points in between the origin point and the end point. However, since the model is trained from real data, where such jumps do not occur, the trained localization model 122 implicitly prevents such nonsense predictions.

After the training process, the trained localization model 122 may be downloaded (e.g., pushed or pulled) over the network 128 to the wearable computer 104 where it may be stored in the data store 120 and used to perform localization for purposes of beamforming, as disclosed herein. Re-training of the localization model 122 may occur periodically, such as daily, weekly, and so forth, when the motion data 118 and/or raw audio data is collected and uploaded over the network 128 to the remote computing resources 124(1)-(N).

The wearable computer 104 may further download a default multibody skeletal model that may be stored in the data store 120 and used with the trained localization model 122 for localization purposes of the user 102. The default multibody skeletal model may be defined for an average-sized human, but it may be updated or customized for the specific user 102 in a number of ways, such as manually (user feedback survey), capturing visual data about the user 102 with an image capture device, and/or collecting motion data 118 when the user 102 is wearing the wearable computer 104.

Returning to the components of the wearable computer 104, the computer-readable memory 112 may be used to store any number of functional, or executable, components, such as programs and program modules that are executable on the processor(s) 110 to be run as software. Each component stored in the computer-readable memory 112 may comprise computer-executable instructions that, when executed, cause the one or more processors 110 to perform acts and to implement techniques described herein. Each component may be in the form of data structures, program modules, or other data. The components included in the computer-readable memory 112 may include a localization module 140 and a beamforming module 142, among other possible modules.

The localization module 140 may be configured to determine a direction (i.e., direction vector) and/or location (direction plus distance or 3D coordinates from a reference point) of the user's mouth 108 (an audio source) relative to the wearable computer 104. The localization module 140 may utilize, at least in part, the motion data 118 generated by the motion sensor(s) 116 to determine the location and/or direction. For example, the trained localization model 122 downloaded to the data store 120 may be used by the localization module 140 to interpret the motion data 118 and output a direction vector in terms of an azimuth angle and elevation angle from the wearable computer 104 to the user's mouth 108. While instantaneous motion data 118 generated by the motion sensor(s) 116 may be used for localization, using a history of the collected motion data 118 (e.g., a time window of the past 5 seconds of motion data 118) may provide more context as to the movement of the wearable computer 104 such that the trained localization model 122 may make a more accurate determination of the direction and/or location of the user's mouth 108 using such a history of motion data 118.

In some embodiments, the motion sensor(s) 116 may be used to determine an orientation (e.g., tilt or rotation) with respect to a reference orientation of the wearable computer 104 for the determination of the direction vector. That is, if a reference orientation is that a local reference plane of the wearable computer 104 is parallel to a ground plane ("ground"), when the wearable computer 104 is tilted so that the local reference plane is no longer parallel to ground, the motion sensor(s) 116 may detect this deviation in order to determine an orientation of the wearable computer 104 relative to ground. As the localization module 140 determines relative location and/or direction of the user's mouth 108, the results may be stored in the data store 120 for further processing, reference, or calibration.

The beamforming module 142 may be configured to receive directional data from the localization module 140 and determine parameters corresponding to one or more beampatterns having directionality in accordance with the direction and/or location of the user's mouth 108 in order to focus the microphone array 106 in the direction of the user's mouth 108. For example, the beamforming module 142 may apply beamformer coefficients or weights to audio signal data generated by the microphone array 106, effectively focusing and increasing gain for the audible sounds emanating from the user's mouth 108. In some embodiments, such beamformer coefficients may be pre-calculated so that the coefficients providing suitable gain or attenuation may be selected based on the direction and/or location determined by the localization module 140. Pre-calculated beamformer coefficients may reduce overall computational cost for the wearable computer 104. In other embodiments, beamformer coefficients may be calculated on-the-fly according to the direction/location determined by the localization module 140. In either case, the coefficients may be stored locally by the wearable computer 104 for faster processing. Beamformer coefficients may be considered a form of weighting applied to the audio signal data from each microphone in the microphone array 106 in order to modify those signals for generating a beampattern.

Beamforming is the process of processing (e.g., applying a set of beamformer coefficients to) audio signal data generated by the microphone array 106 to generate processed data that effectively constructs beampatterns, or effective volumes of gain or attenuation (i.e., 3D beampatterns). A defined beampattern may have a particular gain, attenuation, shape, topology, size, directivity (via a beampattern direction), and so forth that are exhibited in the processed data to cause the microphone array 106 to act as a highly directional microphone array 106. A beampattern may exhibit a plurality of lobes, or regions/volumes of gain, with gain predominating in a particular direction designated as a beampattern direction. A main lobe (sometimes referred to herein as "the beam") extends along the beampattern direction to listen for audio sources at any range from the microphone array 106 along the beampattern direction. Accordingly, beamforming provides a "listening beam" with directionality or directivity that points to an audio source while filtering out extraneous audio or sounds.

It is to be appreciated that a beampattern may comprise a single lobe, considered to be "the beam," that extends along the beampattern direction, although a beampattern may exhibit nulls and additional side lobes as well. Moreover, several different simultaneous beampatterns may be defined by applying different sets of beamformer coefficients to the audio signal data from the microphone array 106, and each beampattern may have a different shape, direction, gain or attenuation, and so forth, as desired.

Using beamforming, the acquired audio signal may be improved in several ways to obtain a higher quality signal. For example, the resulting processed data exhibits a speech signal with a greater signal-to-noise ratio compared to non-beamformer signals (i.e., signals based on sound emanating from outside of the beampattern). Improving the signal-to-noise ratio leads to improved interpretation of audio within the environment. In another example, the processed data may exhibit reduced noise from other spatial locations. In other implementations, other improvements may be exhibited. The processed data from the beamforming module 142 may be further filtered (e.g., using analog or digital band-pass filters configured to pass frequencies of human speech) or otherwise used by other modules of the wearable computer 104 or other computing devices for applications such as speech recognition, audible gesture recognition (e.g., clap, fingersnaps, tapping, etc.), and so forth.

In some embodiments, the wearable computer 104 may be configured to communicate with other local computing devices 144(1), 144(2), . . . , 144(M) that are in relatively close proximity to the wearable computer 104. For example, the user 102 may carry a smart phone or tablet, and/or the user 102 may wear other wearable computing devices like smart glasses, and so forth. In this scenario, the communications connection(s) 126 may enable wired (i.e., electrical couplings like wires, pins, connectors, etc.) or wireless communication between the wearable computer 104 and one or more of the local computing devices 144(1)-(M).

By communicating with one or more other local computing devices 144(1)-(M), the wearable computer 104 may be able to refine or improve upon the accuracy of localization for the user's mouth 108. Accordingly, the communication connection(s) 126 may enable WiFi-based communication such as via frequencies defined by the IEEE 802.11 standards, short range wireless frequencies such as Bluetooth®, or any suitable wired or wireless communications protocol that enables the wearable computer 104 to interface with one or more of the local computing devices 144(1)-(M) that are typically in relatively close proximity to the wearable computer 104. As one illustrative example, by knowing that the user 102 wears smart glasses on his/her head, and through communication with the smart glasses, the wearable computer 104 may be able to more accurately locate the user's mouth 108 in order to perform the beamforming disclosed herein.

Although the wearable computer 104 is shown with the various components of FIG. 1, it is to be appreciated that the wearable computer 104 is only one illustrative example of a wearable computing device, and it is not intended to suggest any limitation as to the scope of use or functionality of the wearable computer 104. For example, other suitable sensors including, but not limited to, range sensors (e.g., ultrasonic, Time of Flight (TOF) sensors, etc.), and the like may be utilized by the wearable computer 104 for purposes of localization. Moreover, other components such as a power source (e.g., battery), an operating system configured to manage hardware and services of the wearable computer 104, and so forth may be included as part of the wearable computer 104 even though they are not shown in FIG. 1.

Figure 2:
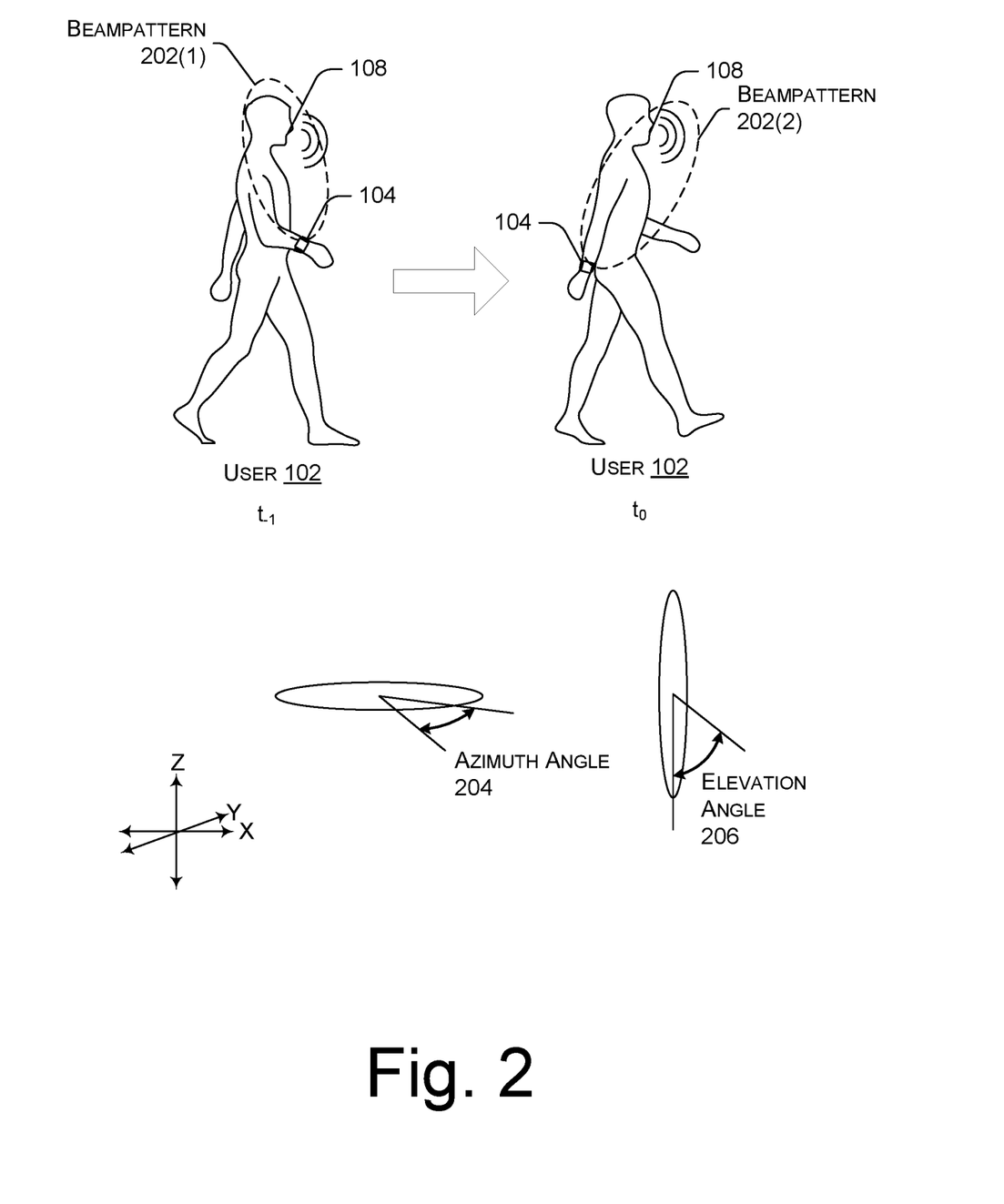
FIG. 2 shows an illustrative environment with an example wearable computer performing beamforming to isolate a user's speech.

FIG. 2 shows an illustrative environment 200 including an example wearable computer, such as the wearable computer 104, performing beamforming to isolate speech of a user, such as the user 102. A user 102 is shown wearing the wearable computer 104, such as a smart watch, on his/her wrist. In some embodiments, upon coming into possession with the wearable computer 104 (e.g., upon purchasing the wearable computer 104), the user 102 may perform a calibration process to customize the functionality of the wearable computer 104 in terms of the beamforming disclosed herein. For example, the wearable computer 104 may be programmed "out-of-the-box" to operate for an average-sized person using a default multibody skeletal model together with the most commonly detected motion data for an average user. However, a calibration process may ask the user 102 for parameters such as his/her height and weight, and/or ask the user 102 to measure a length of his/her arm (forearm and upper arm). Such data may be used to create a customized multibody skeletal model that conforms to the dynamic behavior of the specific user's body, and the wearable computer 104 may utilize a trained localization model, such as the localization model 122, that is based on user parameters similar to those obtained about the user 102.

In some embodiments, calibration may involve instructing the user 102 to hold the wearable computer 104 at different distances from his/her mouth 108 while speaking. For example, the user 102 may hold the wearable computer 104 close to his/her mouth 108 while speaking so that the wearable computer 104 may process the information and obtain a reference point that may help with customized localization for the user's mouth 108. The calibration process may further instruct the user 102 to perform certain movements or activities, such as swinging a tennis racquet, typing on a computer keyboard, and the like. Yet other embodiments may involve obtaining information about the user 102 from the user data 130 stored in the cloud and accessible by the remote computing resources 124(1)-(N). Once calibrated, the wearable computer 104 may be customized to the particular user 102.

While speaking to the wearable computer 104, the user 102 may be performing various tasks involving movement of the wearable computer 104. FIG. 2 shows the user 102 at different points in time; time $t_{-1}$ in the past, and time $t_0$ that is representative of a current time. In the illustrative example of FIG. 2, the user 102 may be walking within the environment 200, and the time $t_{-1}$ may accordingly represent time in the past that is on the order of seconds prior to the current time, $t_0$, given an average walking speed of an average user. The user 102 is shown to be wearing the wearable computer 104 (e.g., a smart watch) on his/her right wrist. As a result of the swing of the user's arm during the walking activity, the wearable computer 104 moves in a 3D space within the environment 200, perhaps both translating and rotating in the process, from time $t_{-1}$ to time $t_0$. Furthermore, the user 102 is shown to be speaking such that utterances are emitted in the form of sound waves from the user's mouth 108. For example, the user 102 may be issuing one or more voice commands to the wearable computer 104 while walking. In addition, the environment 200 may contain other sound sources that emit extraneous audio, such as cars or people in an urban environment, or refrigerators, air conditioners, and so forth in an indoor environment.

Also shown in FIG. 2 is a beampattern 202(1) defined by parameters generated by the beamforming module 142 of the wearable computer 104 at time $t_{-1}$, and a beampattern 202(2) defined by other parameters generated by the beamforming module 142 at time $t_0$. Both of the beampatterns 202(1) and 202(2) are focused on the users mouth 108, but the beampattern 202(1) has different directionality, and possibly different gain or attenuation, than beampattern 202(2) due to the changing geometry between the wearable computer 104 and the user's mouth 108 as the user 102 is walking from time $t_{-1}$ to time $t_0$, swinging his/her arm in the process. The movement of the wearable computer 104 during the walking activity shown in FIG. 2 may be detected by the motion sensor(s) 116 to generate the motion data 118 that is used to perform localization on the user's mouth 108.

It is contemplated that the beamforming techniques described herein are to be used with a wearable computer 104 that is frequently moving relative to the user's mouth 108. Accordingly, "adaptive" beamforming methodologies may be used such that a beam can be steered toward a direction of an audio source whose position may change relative to the wearable computer 104. In this sense, the beamforming module 142 may be configured to track the user's mouth 108, such as by selecting or modifying/updating beamformer coefficients in real-time, or near real-time, based on changes in the motion data 118. For example, while the user 102 is speaking and walking contemporaneously, beamformer coefficients may be successively updated to provide a beampattern focused on the user's mouth 108 while in motion.

The direction from the wearable computer 104 to the user's mouth 108 may be designated by a direction vector in 3D space with an azimuth angle 204 and an elevation angle 206. The azimuth angle 204 indicates an angular displacement relative to an origin, such as local horizontal, while the elevation angle 206 indicates an angular displacement relative to an origin, such as local vertical. As noted above, the motion sensor(s) 116 may be further configured to determine an orientation of the wearable computer 104 with respect to such horizontal and vertical planes in terms of the azimuth and elevation angles 204 and 206 for improving localization.

By focusing the respective beampatterns 202(1) and 202(2) and their resulting gain on the user's mouth 108, the acquired speech signal exhibits an increased signal-to-noise ratio while the audio signals from any extraneous sound sources are attenuated or eliminated. This results in a cleaner audio signal improving results in downstream processing, such as speech recognition.

Figure 3:
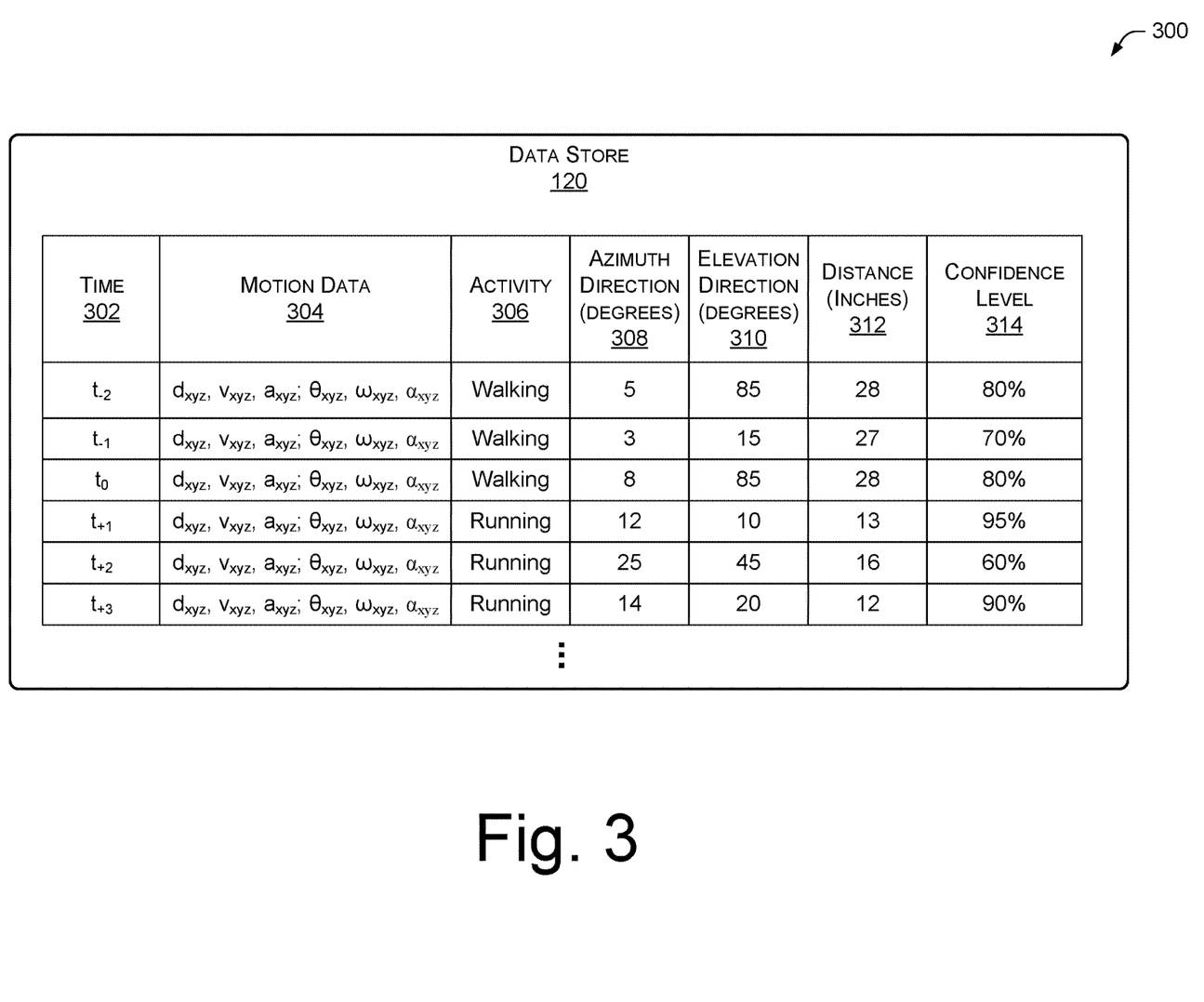
FIG. 3 is a diagram of a localization data store containing information relating to beamforming.

FIG. 3 is an illustrative diagram 300 of the data store 120. The data store 120 is generally configured to store information pertaining to, or used in the process of, localization of an audio source of interest; in this case, the user's mouth 108. The diagram 300 illustrates the information that may be recorded from the estimated direction and/or location of the user's mouth 108 using the trained localization model 122, discussed above. Accordingly, the data store 120 may be configured to store times 302 at which motion data 118 was collected. The times 302 may be in accordance with a global atomic clock or a clock that keeps local time on the wearable computer 104. The intervals between sequential logs may be on the order of milliseconds, seconds, or any suitable regular or irregular time interval.

The data store 120 may further store motion data 304, which may comprise the motion data 118 collected from the motion sensor(s) 116 shown in FIG. 1. For example, one or more gyroscopes, accelerometers, or the like, may obtain measurements pertaining to movement of the wearable computer 104 about a 3D space. Measurements may be generated in terms of a 3D coordinate system, such as Cartesian (X, Y, and Z) or spherical coordinate systems. The motion data 304 may include measurements in terms of displacement (e.g., displacement since the preceding time log), velocity, and/or acceleration of translational movement (denoted by variables: d, v, a) and angular movement (denoted by variables: θ, ω, α). As indicated by the diagram 300, the system may store a history of motion data 304, such as by storing the motion data 118 temporarily, or permanently, in a memory such as a buffer.

In some embodiments, the motion data 304 obtained at the various times 302 may be correlated with an activity 306 based on the trained localization model 122. That is, the motion data 304 may be indicative of a particular activity indicative of a most likely direction vector, or a range of possible directions, to the user's mouth 108 relative to the wearable computer 104. The activity 306 could be any type of activity that the trained localization model 122 is trained with. FIG. 3 shows walking and running as non-limiting example types of activities that may be indicative of directionality of the user's mouth 108 according to the trained localization model 122. Other types of activities that may be determined may include, without limitation, driving, typing on a keyboard, playing a sport (e.g., tennis), holding a particular device (e.g., a smart phone), and the like. It is to be appreciated that directivity may be determined directly from the motion data 304 itself without determining an activity 306, but the activity 306 may provide useful information to constrain a search space for localization. In yet other embodiments, additional information may be derived from the motion data 304 that may assist in the localization process, such as a determination of which appendage (right or left arm or leg) the wearable computer 104 is located on. Such information may further assist in locating, or finding a direction of, the user's mouth 108 by constraining the 3D space to certain zones or areas.

The directionality may be determined in terms of the azimuth direction 308 and elevation direction 310. The azimuth direction 308 and elevation direction 310 may be in terms of degrees or radians and are output by the trained localization model 122 configured to interpret the motion data 304, possibly with the use of the activity 306, to determine or predict a direction of the user's mouth 108 relative to the wearable computer 104. In the first example time log of the diagram 300, the motion data 304 indicates that the user is walking at time $t_{-2}$, and the localization module 140 may then determine that the user's mouth 108 is likely directed in an azimuth of 5 degrees and an elevation of 85 degrees.

In some embodiments, the data store 120 may include a distance 312 from the wearable computer 104 to the user's mouth 108 that may be output by the trained localization model 122. The distance 312 may be determined by interpreting the motion data 304 and/or the activity 306 to at least constrain the search space for distance determination. The distance 312 may also be utilized for various purposes related to beamforming, such as adjustment of the beam-width (e.g., defining a narrow beam when the distance 312 is relatively large).

The data store 120 may further include a confidence level 314 that is indicative of the probability that the user's mouth 108 is in the determined azimuth and elevation directions 308, 310. The confidence level 314 may be based on the level of training that the trained localization model 122 has gone through. For instance, with extensive training data 138, the confidence levels 314 may be higher than with minimal training data 138 available. Continuing with the previous example, the localization module 140 has output an 80% confidence level that the azimuth of 5 degrees and the elevation of 85 degrees are accurate based on the motion data 304 obtained at time $t_{-2}$, indicative of the walking activity 306. In some embodiments, similar confidence levels may be determined and associated with any individual data point or combination of data points, such as a confidence level associated with the activity 306, the azimuth direction 308 alone, the elevation direction 310 alone, and/or the distance 312. In this scenario, a plurality of confidence levels may be computed for any one data point determined by the localization model 122.

Figure 4:
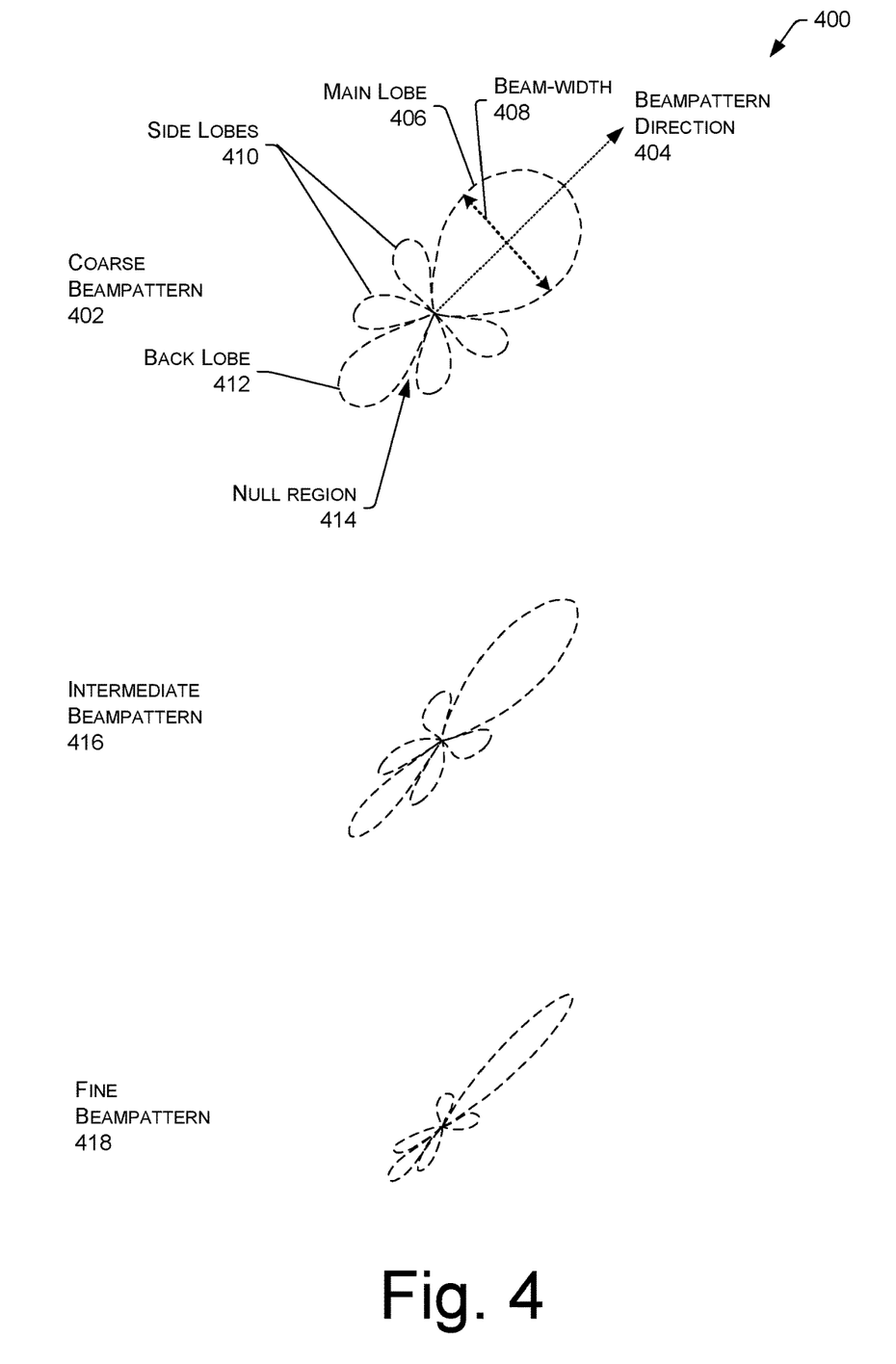
FIG. 4 illustrates different beampatterns that may be defined during beamforming.

FIG. 4 illustrates different beampatterns 400 that may be defined by the beamforming module 142 of the wearable computer 104. The beampatterns 400 may be defined by applying beamformer coefficients to audio signals generated by the microphone array 106, and they may exhibit a directionality according to the direction and/or location determined by the localization module 140 based on the motion data 118 generated by the motion sensor(s) 116 of the wearable computer 104. As mentioned above, the beampatterns 400 generate volumes of effective gain or attenuation. For example, the gain here may be +12 decibels (dB) relative to an isotropic microphone.

Reference is made to the coarse beampattern 402 in order to illustrate the anatomy of the beampatterns 400. Accordingly, the beampatterns 400 may exhibit a plurality of lobes, or regions of gain, with gain predominating in a particular direction designated as the beampattern direction 404. The plurality of lobes may be exhibited in a 3D manner such that the regions of gain comprise effective volumes of gain, even though the beampatterns 400 are depicted in a two-dimensional illustration. Moreover, the beampatterns 400 may be configured to "listen" for audio or sound from audio sources at any range from the microphone array 106 along the beampattern direction 404. A main lobe 406 may extend along the beampattern direction 404. A main lobe beam-width 408 is shown, indicating a maximum width of the main lobe 406. The beampatterns 400 may also exhibit a plurality of side lobes 410. Opposite the main lobe 406, and along the beampattern direction 404, is a back lobe 412. Disposed around the beampatterns 400 are null regions 414. These null regions are areas of attenuation to audio. For example, audio from a sound source (e.g., the user's mouth 108), when positioned within the main lobe 406 along the beampattern direction 404, may benefit from the gain provided by the beampatterns 400 and exhibit an improved signal-to-noise ratio compared to the audio signal acquired without beamforming. In contrast, any audio sources emitting extraneous noise in a null region 414 will show a significantly reduced audio signal.

The beampatterns 400 provide for gain in audio signal acquisition compared to non-beamforming. Beamforming also allows for spatial selectivity (or spatial filtering), effectively allowing the wearable computer 104 to "turn a deaf ear" on an audio signal from a sound source which is not of interest as being outside of the beampatterns 400.

As further illustrated in FIG. 4, the beampatterns 400 may exhibit different shapes or different beam-widths 408 to provide different spatial characteristics of varying levels of refinement for focusing the beampatterns 400. The beampatterns 400 are shown in FIG. 4 to have successively finer spatial characteristics ranging from the coarse beampattern 402 with a largest beam-width 408 to an intermediate beampattern 416 having an intermediate beam-width 408, and finally to a fine beampattern 418 having a smallest beam-width 408.

In some embodiments, the beamforming module 142 of the wearable computer 104 is configured to adjust the beam-width 408 of a beampattern 400 based on the confidence level 314 output by the localization module 140. That is, if the localization module 140 determines a direction of the user's mouth 108 with a low confidence level 314 (e.g., 50% or lower), the beam-width 408 of a beampattern 400 defined by the beamforming module 142 in the determined direction may be wider than the beam-width 408 would otherwise be if the localization module 140 were to have output a higher confidence level 314. A wider beam-width 408 may insure the capture of the audio in the off-chance that the determined direction is incorrect. The beam-width 408 may be adjusted in an inversely proportional manner to the confidence level 314 output by the localization module 140. In other embodiments, predetermined threshold confidence levels 314 may be set, and the beam-width 408 adjusted in a particular manner (i.e., larger or smaller beam-width 408) when the confidence level 314 crosses the predetermined threshold.

In yet other embodiments, the beamforming module 142 may determine beam-widths 408 in accordance with certain activities (e.g., walking) to account for a full range of predicted motion of the wearable computer 104. For instance, a beam-width 408 that encompasses a full range of relative motion of the wearable computer 104 relative to the user's mouth 108 may be determined for motions such as an arm swing while walking, or arm movement while driving, and so forth. In this manner, the amount of beamforming performed by the wearable computer 104 may be reduced if it is determined that the directionality does not need to be re-determined for a given activity due to the beam-width 408 encompassing a full range of predicted motion of the wearable computer 104. Beam-width 408 may additionally, or alternatively, be selected or adjusted based on the distance 312 from the wearable computer 104 to the user's mouth 108.

Figure 5:
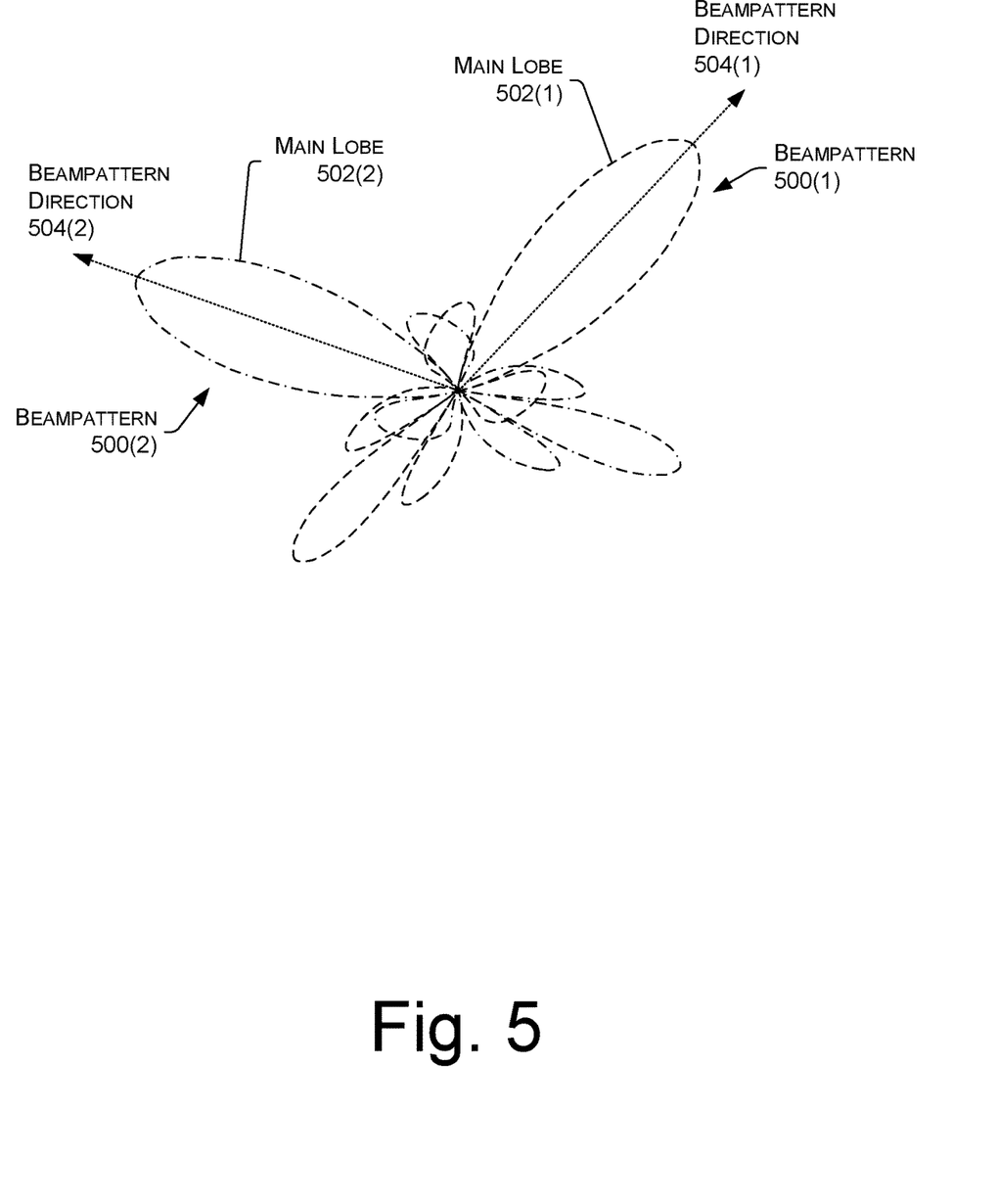
FIG. 5 illustrates multiple, simultaneous beampatterns that may be defined during beamforming.

In some embodiments, the beamforming module 142 may be configured to define multiple, simultaneous beampatterns with different beampattern directions. FIG. 5 illustrates multiple, simultaneous beampatterns including beampattern 500(1) and beampattern 500(2) that may be defined during beamforming. For example, the localization module 140, in some instances, may determine that the user's mouth 108 is in one of two possible directions, and/or one of two possible locations relative to the wearable computer 104. In this scenario, the beamforming module 142 may be configured to define the beampattern 500(1) having a main lobe 502(1) in a beampattern direction 504(1), while simultaneously defining the beampattern 500(2) having a main lobe 502(2) in a beampattern direction 504(2) that is different than the beampattern direction 502(1). The other properties, such as beamwidth, size, shape, and the like may be the same or may vary between the multiple, simultaneous beampatterns. Moreover, although two beampatterns 500(1) and 500(2) are shown in FIG. 5, it is to be appreciated that the beamforming module 142 may be configured to determine parameters corresponding to any number of beampatterns, such as more than two beampatterns.

In some embodiments, the wearable computer 104 may be configured to leverage additional techniques or devices in order to improve localization accuracy. That is, the above described beamforming techniques may provide a first level approximation of a direction of the user's mouth 108 upon which the microphone array 106 is to be focused. The wearable computer 104 may be further configured to refine this first level approximation by the use of sound source localization (SSL) techniques. For instance, an SSL technique may use the determined direction and/or location information from the localization module 140 in order to constrain the search space for determining a final direction and/or location of the user's mouth 108 using SSL. Constraining the search space may significantly reduce the computational cost in terms of resources used to perform SSL as an augmentation technique.

In other embodiments, the user's mouth 108 may be localized by techniques including structured light, image capture (e.g., infrared imaging), manual entry, trilateration of audio signals, audio time difference of arrival, ranging techniques (e.g., LIDAR, ultrasonic, stereoscopic, etc.), and so forth. The wearable computer 104 may comprise a projection component that projects a pattern onto objects (e.g., the user's body or head) within its field of view to determine position based upon sensing the interaction of the objects within the pattern. The pattern may be regular, random, pseudo-random, and so forth. For example, a structured light system may determine the user's face is at particular coordinates relative to the wearable computer 104.

In some embodiments, localization may be further refined by detecting a maximum signal among a plurality of beampatterns generated by the beamforming module 142. That is, initial beampatterns may be defined based on the localization module's determination of direction and/or location, and then the localization module 140 may search for signal strength maximums to identify a maximum audio signal among the defined beampatterns, selecting the beampattern with the maximum audio signal as a final beampattern having a particular beampattern direction 404. In some embodiments, an iterative process of defining sets of beampatterns with successively finer resolution may be performed so that the user's mouth 108 may be located with greater accuracy.

In some embodiments, the wearable computer 104 may communicate with other local computing devices 144(1)-(M) to refine a first level approximation of localization. For example, a transceiver of a smart phone that is typically located in the front pocket of the user's trousers, or a transceiver of a pair of smart glasses worn by the user 102, may be discovered to pair the smart phone and/or smart glasses with the wearable computer 104 using a short range wireless communication protocol (e.g., Bluetooth®). This pairing may enable the wearable computer 104 to determine a distance from itself to the other local computing device 144. Based on known information about the location of the local computing device 144 with respect to the user 102 (e.g., glass worn on the user's head), the wearable computer 104 may deduce a location of the user's mouth 108 relative to the wearable computer 104.

Other optimization techniques may be enabled with the wearable computer 104, such as offloading of processing to the other local computing devices 144(1)-(M) detected to be within a predetermined proximity of the wearable computer 104. Furthermore, an atomic clock may be referenced to determine a time of day that indicates the likelihood of an environment containing large amounts of extraneous audio. The wearable computer 104 may comprise a global positioning system (GPS) receiver to deduce a location of the user 102 (e.g., located at home or in a nightclub) such that the expected noise level in the environment may be deduced. Noise monitoring may also be performed by the wearable computer 104 using the microphone array 106. Based on a prediction or determination of the level of environmental noise according to any or all of the abovementioned techniques, the wearable computer 104 may adjust the severity of the beamforming techniques used. That is, beamforming may be performed to a lesser degree in a quiet environment, as opposed to a noisy environment, conserving computational resources.

In some embodiments, power management functions may be enabled by turning the beamforming process "on" or "off" according to trigger events detected by the wearable computer 104 to conserve power resources (e.g., batteries). For example, a keyword spotter may be used to detect a keyword that initiates the beamforming process by the wearable computer 104. Additionally, or alternatively, motion detection by the motion sensor(s) 116 may trigger the beamforming process such that beamforming is not continuously executing, even when the user 102 is at rest. In other words, initial adaptive beamforming may be performed, and then if no motion is detected by the motion sensor(s) 116, the defined beampattern may be maintained as a fixed beam when there is no motion of the wearable computer 104.

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 6:
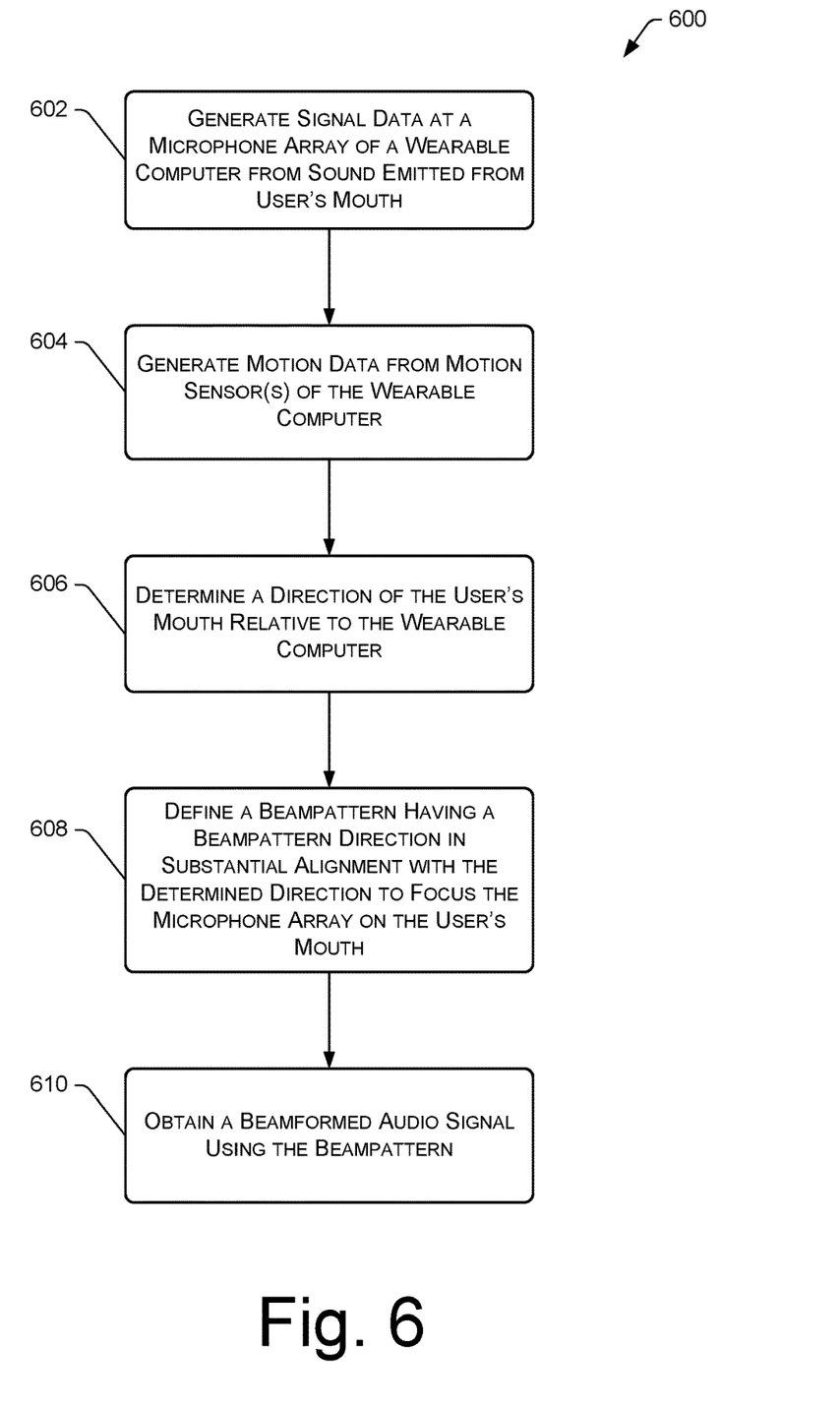
FIG. 6 is an illustrative process of isolating a user's speech using beamforming.

FIG. 6 is an illustrative process 600 of isolating a user's speech using beamforming based on motion data. At 602, audio signals are generated at the microphone array 106 of the wearable computer 104. The audio signals are generated from audio, sound, or utterances detected at the microphone array 106 that emanate from the mouth 108 of a user 102 associated with the wearable computer 104.

At 604, motion data 118 may be generated in response to movement of the wearable computer 104. One or more motion sensors 116, such as a gyroscope(s), are configured to detect movement of the wearable computer 104 and generate the motion data 118. The motion data 118 may be in the form of translational and/or angular displacement, velocity, and/or acceleration within a 3D space. Any suitable coordinate system may be used to generate the motion data 118 that is representative of six-component motion (i.e., X, Y, Z translational movement plus roll, pitch, and yaw rotation).

At 606, a direction of the user's mouth 108 relative to the wearable computer 104 is determined from the motion data generated at 604. In some embodiments, a trained localization model 122 (e.g., a neural network model) may be used to interpret the motion data generated at 604 and output a directionality of the user's mouth 108 relative to the wearable computer 104. The directionality may be in terms of a relative azimuth angle and elevation angle from the wearable computer 104. In some embodiments, a relative location of the user's mouth 108 with respect to the wearable computer 104 may be determined, which, in some cases, may be output in terms of a magnitude of a direction vector.

At 608, a beampattern may be defined based on the localization determination at 606, the beampattern having a beampattern direction 404 in substantial alignment with the determined direction from step 606. In some embodiments, the beampattern is defined by applying a set of beamformer coefficients to the audio signal generated by the microphone array 106 at 602 to generate processed data which focuses the microphone array in a direction of the user's mouth 108.

At 610, a beamformed audio signal may be obtained using the defined beampattern. In some embodiments, the beamformer coefficients that are applied to the audio signals result in obtaining the beamformed audio signal. In some embodiments, the wearable computer 104 may perform speech recognition or other downstream processing on the beamformed signal after it is obtained.

Figure 7:
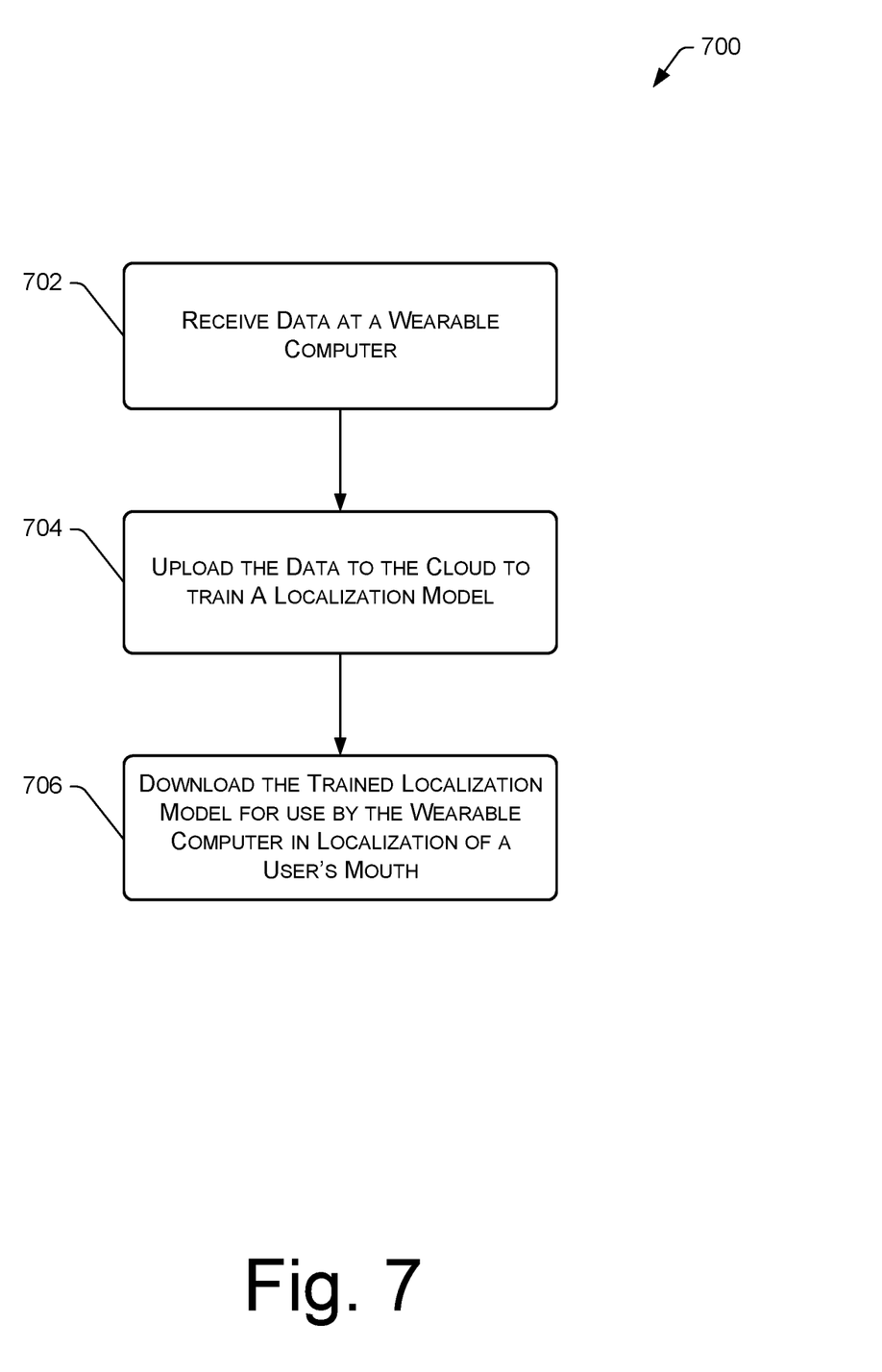
FIG. 7 is an illustrative process of uploading data associated with a wearable computer for training a localization model used for beamforming.

FIG. 7 is an illustrative process 700 of uploading data associated with a wearable computer for training a localization model 122 used for beamforming. At 702, the wearable computer 104 may receive or otherwise collect data including, but not limited to, raw audio data (e.g., audio signals based on utterances emitted from the user's mouth 108), beamformed audio signals, motion data, such as the motion data 118, and/or calibration data. For example, as the user 102 wears the wearable computer 104, the motion data 118 may be continuously collected, and as the user 102 speaks, audio signals may be generated by the microphone array 106. As another example, the wearable computer 104 may initiate a calibration process, such as after the user 102 purchases the wearable computer 104 and uses it for a first time. During the calibration process, the user 102 may be asked questions in the form of a user survey, and or instructed to perform particular tasks like speak with the wearable computer 104 held close to his/her mouth 108, or with the wearable computer 104 on his/her wrist and his/her arm resting at his/her side in a standing position. In some embodiments, the wearable computer 104 may receive user data 130 over a network 128 to obtain or infer information about the user 102. For example, user height and/or weight may be specified in a user account maintained in the user data 130.

At 704, the wearable computer 104 may upload the data to the cloud, such as by uploading the data over the network 128 to the remote computing resources 124(1)-(N) where a localization model 122 for the wearable computer 104 may be trained or re-trained. For example, a neural network may be used to train a localization model 122 that is provided on the wearable computer 104 "out-of-the-box," and this trained localization model 122 may be maintained in the cloud in association with the wearable computer 104. Upon uploading data (e.g., motion data 118, audio signals, calibration data, etc.) that may be specific to the user 102, the remote computing resources 124(1)-(N) may perform the computationally intensive task of re-training the localization model 122 with the recently collected data that is uploaded from the wearable computer 104 over the network 128.

At 706, the trained, or re-trained, localization model 122 may be downloaded by the wearable computer 104 for use thereon, such as to perform beamforming as described herein. The uploading and downloading of steps 704 and 706, respectively, may be performed at a user command, periodically, such as daily, or upon the occurrence of an event (e.g., during charging of the wearable computer 104 and/or when the wearable computer 104 is connected to a wireless network).

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
   receiving, using a microphone array of a wearable computer, audio of an utterance from a user associated with the wearable computer;
   generating, using the microphone array of the wearable computer, a plurality of audio signals representing the utterance detected by the microphone array;
   determining a wrist of the user on which the wearable computer is located;
   determining, based at least in part on which wrist the wearable computer is located, a direction vector from the wearable computer towards a mouth of the user;
   determining coefficient data corresponding to a beampattern such that the plurality of audio signals are processed to increase a signal to noise ratio with respect to the mouth of the user, the coefficient data selected based at least in part on the direction vector; and
   generating a beamformed audio signal using the plurality of audio signals and the coefficient data.

2. The method of claim 1, further comprising determining that the wearable computer is located on at least one of a right wrist of the human body, a left wrist of the human body, a right ankle of the human body, or a left ankle of the human body.

3. The method of claim 1, further comprising accessing a multibody skeletal model describing a dynamic behavior of at least a portion of mea human body, wherein the determining the coefficient data is based at least in part on the multibody skeletal model.

4. The method of claim 3, further comprising determining, based at least in part on the multibody skeletal model, the direction vector pointing from the wearable computer toward the mouth of the user in relation to mea reference orientation.

5. The method of claim 4, wherein:
   the reference orientation comprises an orientation of the wearable computer in relation to a ground plane of the earth; and
   the direction vector is defined in terms of an azimuth angle and an elevation angle from the wearable computer to the mouth of the user.

6. The method of claim 3, wherein the multibody skeletal model is customized to at least the portion of the human body based on at least one of orientation data or audio signal data obtained by the wearable computer.

7. The method of claim 1, further comprising:
   determining a distance from the wearable computer to the mouth of the user; and
   selecting a shape of the beampattern based at least in part on the distance.

8. The method of claim 1, further comprising storing orientation data as buffered orientation data for a period of time after the one or more sensors generate the orientation data.

9. A wearable computer comprising:
   one or more processors;
   a microphone array comprising a plurality of microphones coupled to the one or more processors and configured to generate a plurality of audio signals from an utterance detected by the microphone array, wherein the utterance is from a user associated with the wearable computer;
   one or more sensors coupled to the one or more processors and configured to generate data indicating determining a wrist of the user on which the wearable computer is located; and
   one or more memories storing instructions executable by the one or more processors, to perform operations comprising:
      determining, based at least in part on which wrist the wearable computer is located, a direction vector from the wearable computer towards a mouth of the user;
      determining coefficient data corresponding to a beampattern such that the plurality of audio signals are processed to increase a signal to noise ratio with respect to the mouth of the user, the coefficient data selected based at least in part on the direction vector; and
      generating a beamformed audio signal using the plurality of audio signals and the coefficient data.

10. The wearable computer of claim 9, the operations further comprising determining the direction vector based at least in part on a multibody skeletal model stored in the one or more memories, the multibody skeletal model describing a dynamic behavior of at least a portion a human body.

11. The wearable computer of claim 10, the multibody skeletal model being customized to at least a portion of a body of the user based on at least one of orientation data or audio signal data obtained by the wearable computer.

12. The wearable computer of claim 9, wherein the direction vector is a first level approximation from the wearable computer towards the mouth of the user, and wherein the operations further comprise refining the direction vector based at least in part on a sound source localization technique.

13. The wearable computer of claim 9, the operations further comprising:
 determining a confidence level of the direction vector; and
 selecting a width of the beampattern based at least in part on the confidence level.

14. The wearable computer of claim 9, wherein the one or more sensors are further configured to determine that the wearable computer is located on at least one of a right wrist of the user, a left wrist of the user, a right ankle of the user, or a left ankle of the user.

15. The wearable computer of claim 9, the operations further comprising determining a reference orientation comprising an orientation of the wearable computer in relation to a ground plane of the earth.

16. The wearable computer of claim 9, the operations further comprising determining a distance from the wearable computer to the mouth of the user, and wherein a beamforming module is further configured to select a shape of the beampattern based at least in part on the distance.

17. One or more non-transitory computer-readable media storing computer-executable instructions that, when executed, cause one or more processors to perform acts comprising:
 receiving, using a microphone array of a wearable computer, audio of an utterance from a user associated with the wearable computer;
 generating, using the microphone array of the wearable computer, a plurality of audio signals representing the utterance detected by the microphone array;
 determining a wrist of the user on which the wearable computer is located;
 determining, based at least in part on which wrist the wearable computer is located, a direction vector from the wearable computer towards a mouth of the user;
 determining coefficient data corresponding to a beampattern such that the plurality of audio signals are processed to increase a signal to noise ratio with respect to the mouth of the user, the coefficient data selected based at least in part on the direction vector; and
 generating a beamformed audio signal using the plurality of audio signals and the coefficient data.

18. The one or more non-transitory computer-readable media of claim 17, further comprising determining a direction of the mouth of the user based at least in part on a user-specific localization model that is configured to interpret orientation data to output the direction of the mouth of the user.

19. The one or more non-transitory computer-readable media of claim 18, wherein the user-specific localization model is further configured to utilize a multibody skeletal model in combination with the orientation data to determine the direction of the mouth of the user.

20. The one or more non-transitory computer-readable media of claim 18, the operations further comprising determining a reference orientation comprising an orientation of the wearable computer in relation to a ground plane of the earth.

* * * * *